United States Patent [19]

Planes et al.

[11] 4,214,646
[45] Jul. 29, 1980

[54] SPACE DIVIDER AND ACOUSTIC PANEL

[75] Inventors: Felipe Planes, High Point, N.C.; Charles A. Eckerline, Ladysmith, Wis.; Gordon A. Erickson, St. Paul, Minn.

[73] Assignee: Conwed Corporation, St. Paul, Minn.

[21] Appl. No.: 916,496

[22] Filed: Jun. 19, 1978

[51] Int. Cl.$^2$ .................. E04B 1/343; E04B 1/99
[52] U.S. Cl. ................................. 181/287; 181/290
[58] Field of Search ............... 181/30, 286, 287, 290, 181/294, 295, 284, 285, 210, 291; 160/135, 351; 428/328; 52/144, 145; 256/23-27, 73

[56] References Cited
U.S. PATENT DOCUMENTS

| 1,022,951 | 4/1912 | Josz | 181/290 |
| 1,984,190 | 12/1934 | Huggine | 181/284 |
| 2,263,828 | 11/1941 | Smith | 181/294 |
| 3,462,899 | 8/1969 | Sherman | 181/290 |
| 3,573,145 | 3/1971 | Witkosky et al. | 181/287 |
| 3,605,851 | 9/1971 | Miles et al. | 160/351 |
| 3,949,827 | 4/1976 | Witherspoon | 181/284 |
| 4,057,123 | 11/1977 | Erickson | 181/286 |

Primary Examiner—L. T. Hix
Assistant Examiner—Benjamin R. Fuller
Attorney, Agent, or Firm—Eyre, Mann, Lucas & Just

[57] ABSTRACT

An improved space divider is disclosed. The divider comprises two half-panels which are joined together and supported to being free-standing. A specific construction is also disclosed which has excellent acoustic properties together with a good fire rating.

19 Claims, 13 Drawing Figures

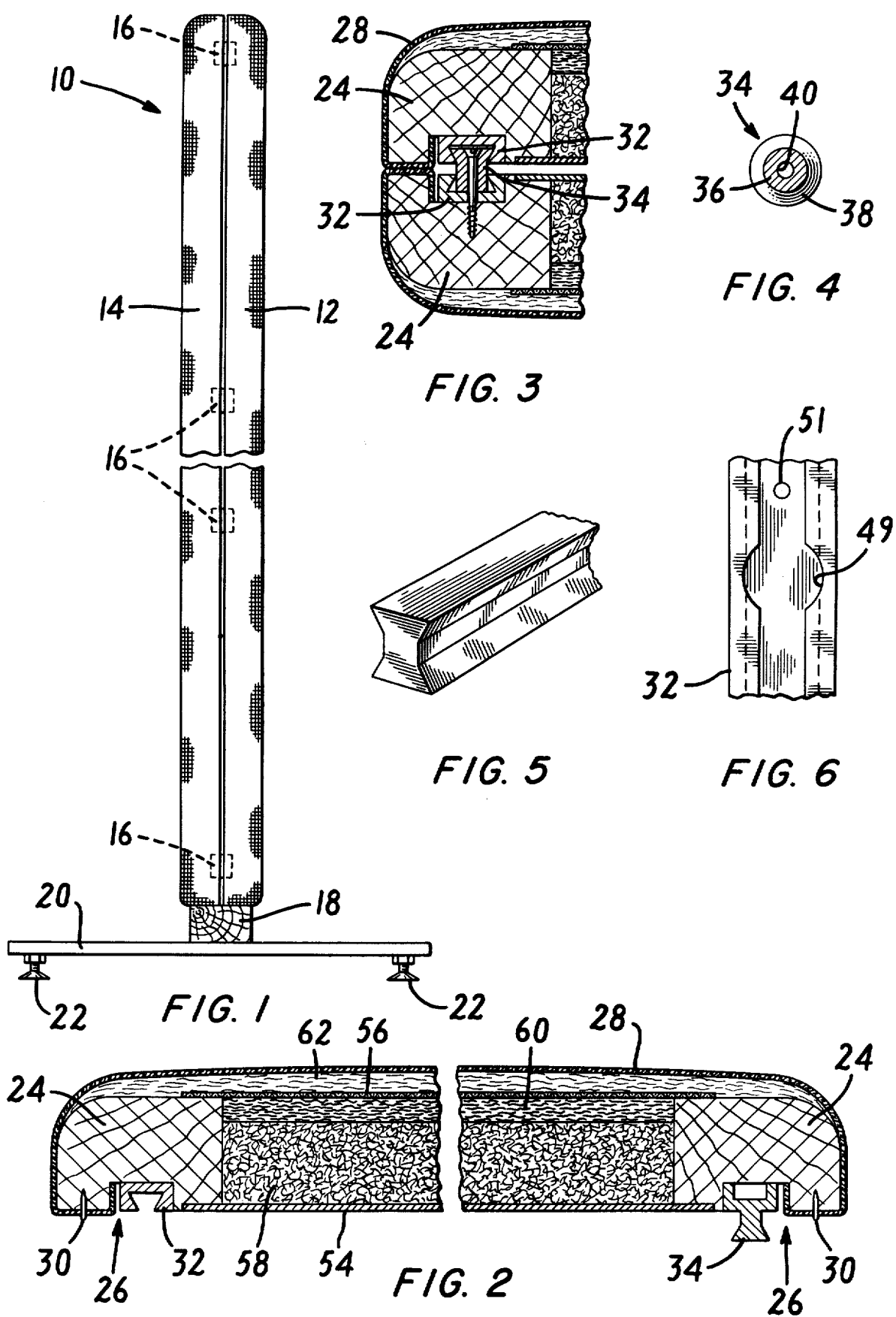

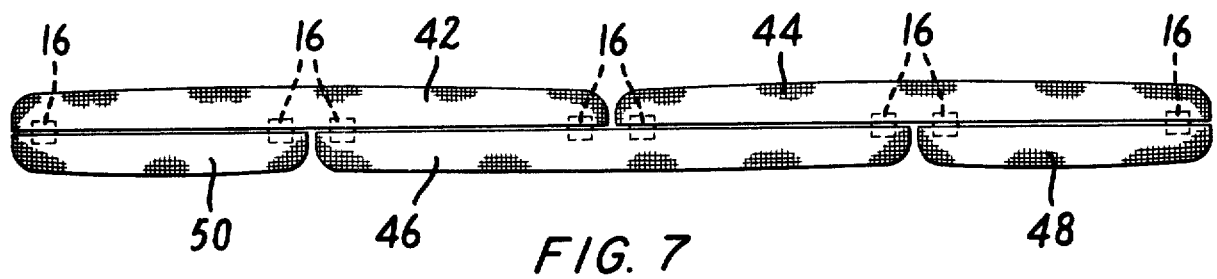
FIG. 7
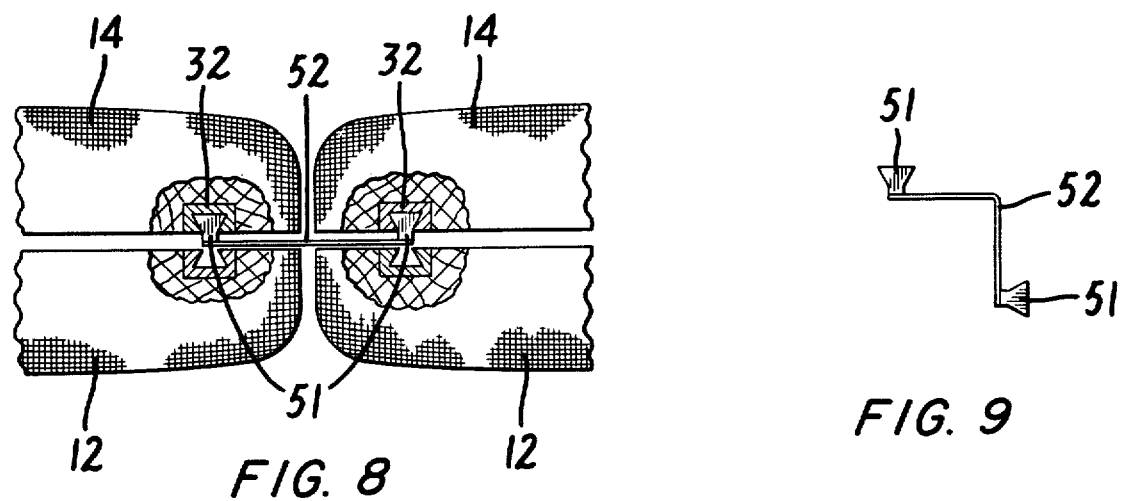
FIG. 8
FIG. 9
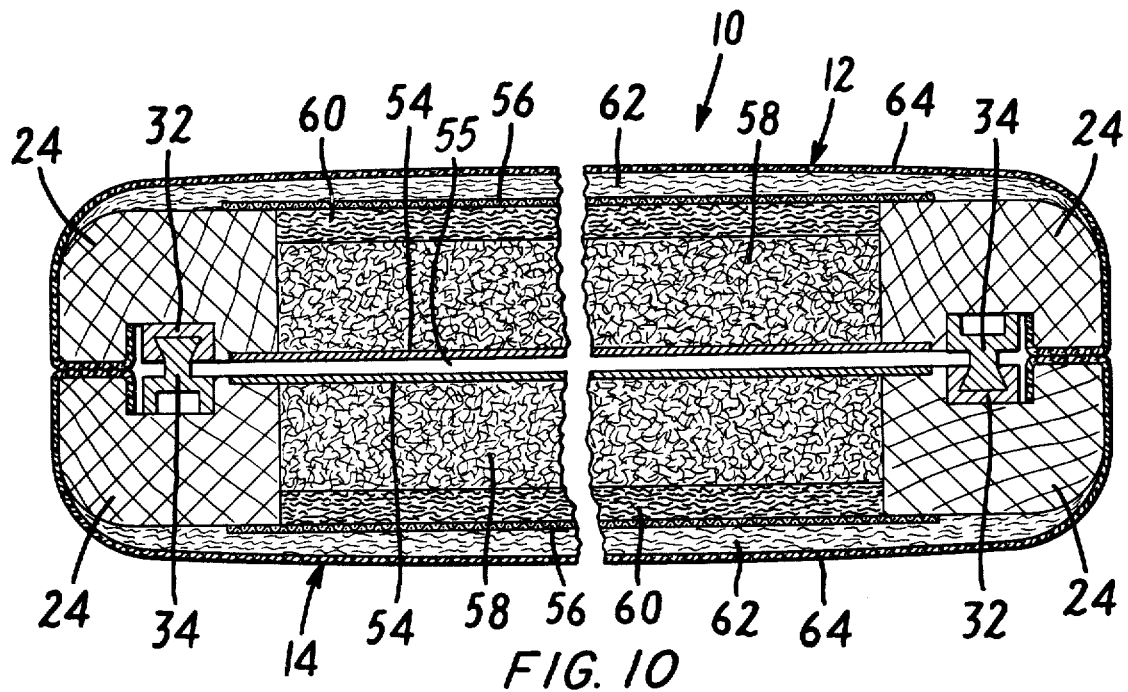
FIG. 10

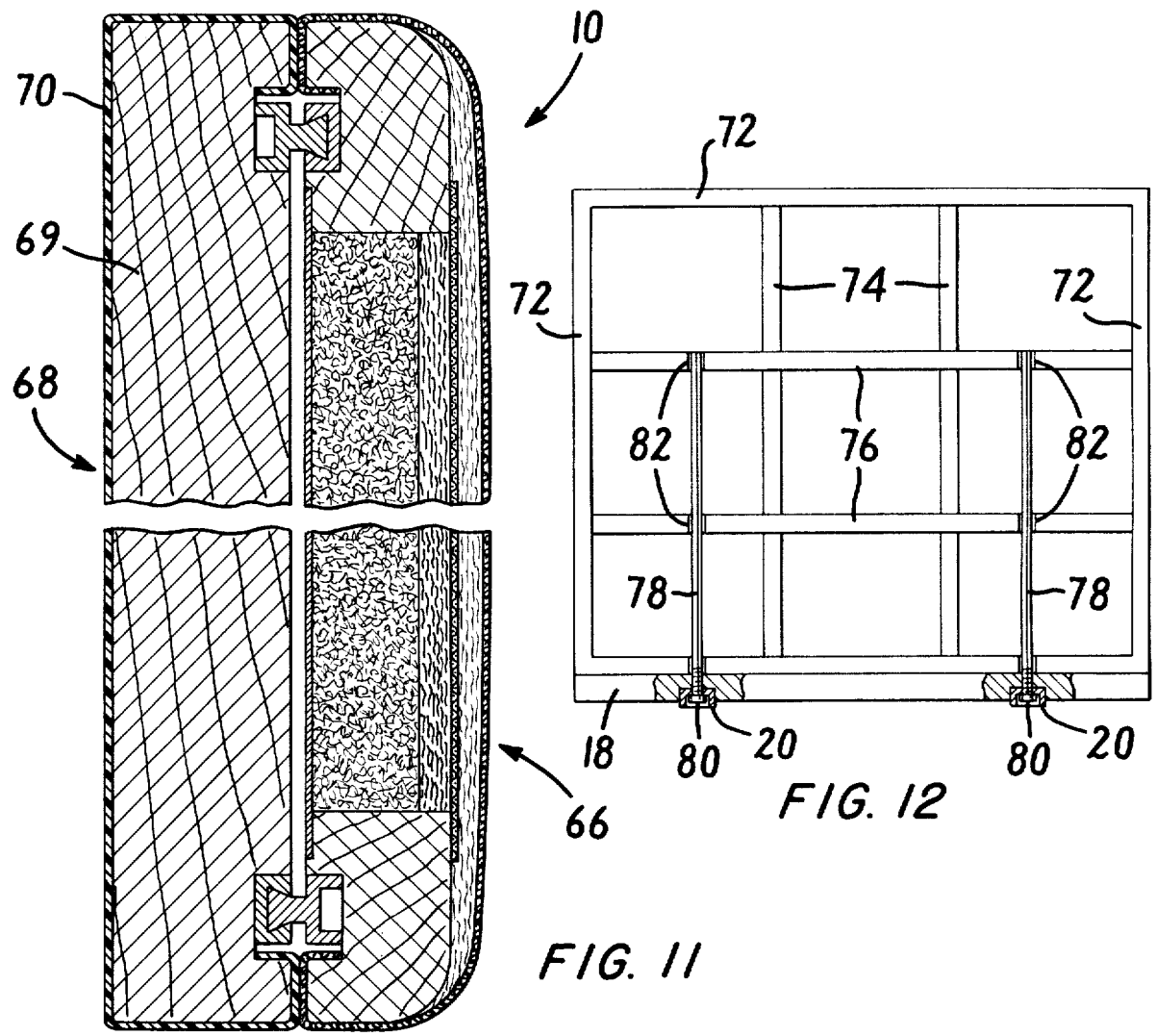
FIG. 11
FIG. 12
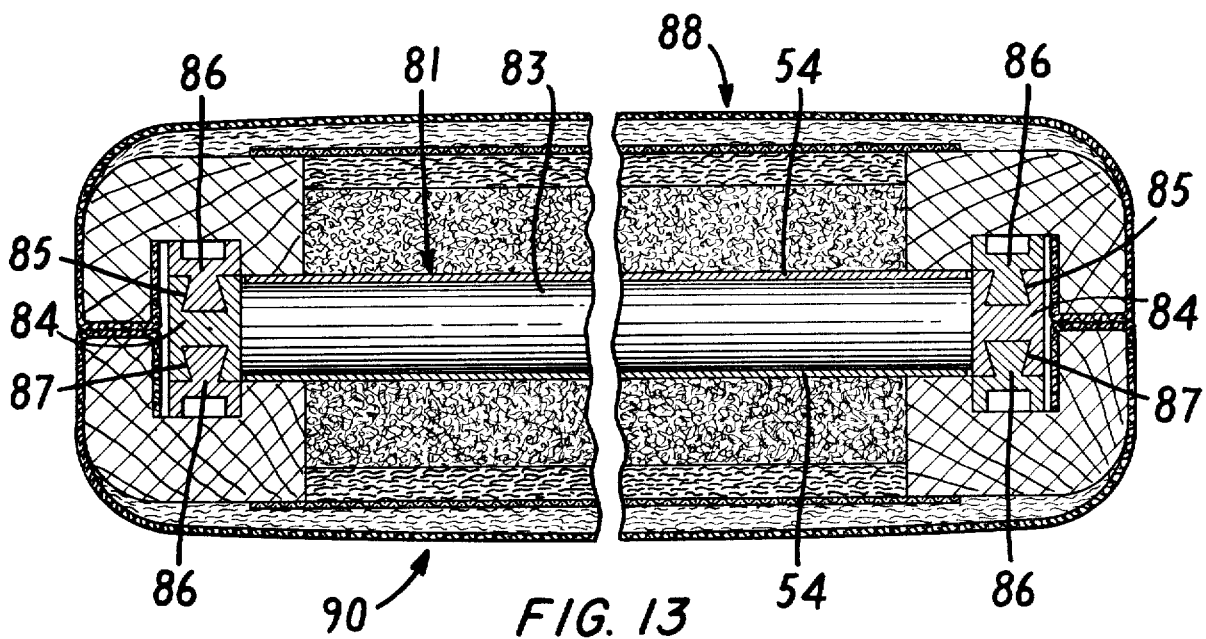
FIG. 13

4,214,646

SPACE DIVIDER AND ACOUSTIC PANEL

BACKGROUND OF THE INVENTION

The remodeling of office interiors has historically been an expensive and disruptive procedure. In recent years, many firms have abandoned the traditional layout consisting of open office pools adjacent to private offices which are enclosed by permanent walls. These inflexible lay-outs are expensive to remodel when departmental realignment dictates the creation of new enclosed offices or an expansion of the open office pool area.

A number of companies have solved this problem by selecting the so-called "open office plan" for newly constructed or remodeled office areas. This scheme typically includes portable work stations, acoustic space dividers, and acoustical ceiling materials. One of the important elements of this lay-out is the space divider, which can, if acoustically suitable, provide both visual and speech privacy. U.S. Pat. Nos. 3,592,288; 3,592,289; and 4.057,123 describe the theory and recent developments in acoustic space divider construction.

Although space dividers provide the desired flexibility in office arrangements for low rearrangement costs, there are certain inherent drawbacks in utilizing these units. The dividers are prone to wear and tear from normal use, or even a quick demise from accidental spills or tearing, but the high cost and difficulty of repairing them usually necessitates expensive replacement instead. This replacement is considerably more expensive than the repainting or redecorating of traditional office areas.

There also exists a serious problem with color. In order to avoid a monolithic appearance it is desirable to have different color schemes in various office spaces and other work areas in an open plan environment. This can be accomplished by using different colors on the two sides of a divider and coordinating the office furniture to the particular color. However, most manufacturers of space dividers do not warehouse anything other than single color (i.e. same color on both faces) dividers simply because of the great number that would be needed. For example, if a manufacturer uses 9 basic colors, warehousing of only one unit of all the combinations would require 45 individual units. As a result, multicolored dividers must usually be specially ordered, a procedure which takes a considerable amount of time. Even when this is done, there is still a problem if it is later decided that one office or work area is "out of place". When it is moved to its correct position there will necessarily be a conflict between the furniture and the divider color in one of the areas affected by the move.

BRIEF SUMMARY OF THE INVENTION

The present invention overcomes the disadvantages of known dividers. The applicants have discovered that an acoustic space divider can be made up of two half-panels and have discovered that very substantial advantage can be obtained with this construction. The two half-panels can be easily separated later for recovering or interchanging with other half-panels.

Many other advantages also accrue from the present invention in addition to the comparative ease of recovering worn-out or damaged panels. For example, inventory stock at warehouses can be substantially reduced since it is only necessary to maintain the basic colors. These can then be matched together at the time of shipment to the customer or the individual half-panels can even be transported separately and assembled at the final site. This latter feature also has advantage in handling since each half-panel will obviously be only half the weight of a full panel.

A still further advantage obtained with the construction of the present invention is ease of manufacture. Since two half-panels are made which are subsequently joined together, there are no seams which must be "buried" for neat appearance and, in fact, the back of each panel can be made relatively rough since it will not be seen in the finished panel.

Yet another advantage is that, where strength is necessary or desirable, the panels can be offset with respect to each other rather than in registered alignment. In this way, a unitary wall can be formed and the panels will not inadvertently move out of alignment.

Furthermore, the structure of the present invention permits the use of one of the half-panels as a wall panel, i.e. it can be hung directly on a supporting wall. This eliminates the need for inventorying separate wall panels and space divider panels and it also eliminates the need for using a space divider panel adjacent a structural wall as is sometimes done in order to improve appearance and have acoustic absorption along structural walls. Wall panels matching space divider panels are not available.

In addition to the foregoing, the present invention also discloses a specific structure having a acoustically high performance while at the same time having an excellent fire rating. More particularly, the specific structures disclosed have a Class 1 fire hazard rating according to ASTM E84-68 and a minimum Noise Reduction Coefficient of 0.90 according to ASTM C423-66. In addition to this, the acoustic divider of the present invention has a Sound Transmission Class of not less than 30 according to ASTM 413-73 and a Noise Isolation Class of 20 according to PBS C.2.

These and other aspects of the present invention may be more fully understood with respect to the drawings wherein:

FIG. 1 is an end view of a space divider according to the present invention.

FIG. 2 is a top cross-sectional view of a half-panel of the present invention.

FIG. 3 shows a preferred form of connector.

FIG. 4 is an end view of element 34 of FIG. 3.

FIG. 5 is an alternate embodiment of part of a connector.

FIG. 6 is a modified form of part of a connector.

FIG. 7 shows a plurality of half-panels connected in offset relationship.

FIG. 8 shows a connector for joining two panels.

FIG. 9 shows a modified embodiment of FIG. 8 for use at corner connections.

FIG. 10 is a top cross-sectional view of the preferred construction of the half-panels of the present invention.

FIG. 11 shows an alternative embodiment of half-panels.

FIG. 12 shows a suitable framework for specific half-panels of FIG. 10.

FIG. 13 is a top cross-sectional view of an alternative embodiment employing a supporting frame.

Referring to FIG. 1, an acoustic divider 10 is disclosed comprising two half-panels 12 and 14. The half-panels are affixed together by a plurality of hidden connectors 16 and are joined at the bottom to a support so that they are freestanding, suitably a base 18 which includes legs 20 (only one shown) and leveling feet 22. It will be appreciated that legs 20 could be directly connected to the half-panels 12 and 14 to serve as the sole support if desired but the use of a base 18 is preferred from both an aesthetic and structural point of view.

The half-panels 12, 14 may be affixed to the base 18 by any suitable means including wood screws, bolt and T-nuts, etc. which join the frame members of the panel to the base. Preferred embodiments of fasteners 16 are disclosed hereinafter but other fasteners may be used if desired.

Referring now to FIG. 2, there is shown a top cross-sectional view of the embodiment of FIG. 1. As there shown, each half-panel 12, 14 comprises wooden framing members 24 to the back 26 of which the fabric covering 28 can be easily affixed by staples 30 or other means such as screws, nails, etc. When it is desired to recover a panel, the panels 12 and 14 are separated from each other. Thereafter, the fabric layer 28 can be removed and a new fabric applied. Alternatively, a new fabric can simply be placed over existing fabric 28 and stapled to the wooden frame members 24. It will be appreciated that this replacement of fabric is a relatively easy procedure which can be done in an office in a fairly short period of time thereby obviating the need for disrupting the entire office for weeks or months while the panels are returned to the factory for recovering or while new replacement panels are installed.

In FIG. 3 there is shown a suitable connector for use in the present invention. The connector is suitably affixed to the framing members 24 of the panels. It will be appreciated that where a rather long half-panel is employed there can be more than the two framing members 24 shown in FIG. 2 (see, for example, FIG. 12) and, similarly, there can be more of the connectors shown in FIG. 3. Affixed to each framing member 24 is a length of metal 32 with a dovetail groove therein. The length of the grooved member 32 is not critical except that it must not extend to the visible edge of the panel since it is intended to be hidden. For a six-foot high panel, a grooved member about 4½ feet in length is suitable. Each of these is suitably affixed by wood screws or the like. It is to be noted that use of dovetail grooves on all half-panels is desirable since the use of dovetail tongues on one set of half-panels and dovetail grooves on the other set of half-panels would necessarily increase the inventory unless they were alternated (see FIG. 10). To the groove 32 of one of the half-panels is affixed a dovetail tongue member 34, suitably by a wood screw through the middle thereof. A back end view of one such member 34 is shown in FIG. 4 and includes a cylindrical portion 36, a beveled portion (the dovetail tongue) 38 and a screw receiving hole 40. A plurality of these are affixed within one of the grooves 32, suitably three such members about two feet apart for a six-foot high panel. The half-panels 12 and 14 can then be slipped together after which they can be joined to the base or legs as described with respect to FIG. 1.

An alternative form of construction is to replace tongued members 34 with a single double-tongued rod as shown in FIG. 5. In this instance the double-tongued rod is slipped into the groove 32 of one of the half-panels after which the other half-panel is slipped over the double-tongued rod. It will also be appreciated that the same result can be accomplished by using tongues on each of the half-panels 12, 14 and a double grooved rod to slip over the tongues (cf. the connectors of FIG. 13). In all of these embodiments, the panels can be easily slipped together and apart and yet the connector remains completely hidden since it does not extend all the way to the top of the half-panels.

As shown in FIG. 6, one or more holes 49 can be provided in grooved member 32 for receiving a tongued member such as that of FIG. 4. This has particular advantage in that tongued member 4 can be affixed to a wall and then one of the half-panels of the present invention can be hung thereon as a wall panel. Since it is usually considered desirable not to have wall panels extend all the way to the floor, a stop member 51 such as a wood screw, peg, shouldered bolt or the like may be affixed in the groove against which the tongued member can bear.

The connectors described hereinbefore in detail fit together by sliding engagement and this is the preferred form of construction because of ease, positive horizontal and front-to-back lock and low cost. However, other forms of attachment can also be used, e.g. post and resilient retaining clip, Velcro brand fasteners and the like. The three essential features of the releasable connectors is that they are positioned on the back of the half-panels, that they are not visible when two half-panels are assembled in abutting relationship and yet that they are relatively easy to release, i.e. the two half-panels can be separated and then reunited without causing visible damage to the normally visible portion of either half-panel.

While the connecting means as shown in FIG. 3 shows the two frame members 24 in aligned relationship, advantage can also be obtained by positioning the connnector means so that opposed half-panels are offset with respect to each other. Referring to FIG. 7, panels 42, 44, 46, 48 and 50 are shown having connectors 16 joining them together. Half-panels 42, 44, and 46 are of the same length while half panels 48 and 50 have a length which is only half the length of the other panels. In this way, and as shown, the panels can be offset so that they have greater structural rigidity and do not have a tendency to become misaligned with respect to each other.

Where it is not desired to use the configuration shown in FIG. 7 but it is still desired to have rigidity between adjacent panels, this can be accomplished by using an alternative embodiment of the connector of FIG. 4 such as that shown in FIG. 8. In this instance, the connector comprises two dovetail tongue shaped members 51 connected together by leg 52. Note that this connector can be attached to half-panels 12 before half-panels 16 are put in place whereby the connector joins the half panels in the manner of FIG. 3 and also joins the adjacent panels. It will be appreciated that such a structure can also be used for right-angle corners as shown in FIG. 9 and, of course, leg 52 can be bent to any suitable angle for corners which are other than right angles.

FIG. 10 is a cross-sectional top view of the preferred embodiment of the invention. Acoustic space divider 10 is assembled by slipping together the two half-panels 12 and 14 as previously described. Frame members 24 provide a stable framework for the divider and can be any material sufficiently strong for the purpose. In the preferred embodiment, wood is employed which is rated as fire retardant by Underwriter's Laboratory. For small half-panels, a rectangular configuration of the framing members would be sufficient to support the unit. As the size increases, additional vertical and horizontal framing members may be necessary or desirable.

In FIG. 12 is shown a suitable configuration of a frame according to the present invention for a panel having nominal dimensions of 4-6 feet in height and 4-8 feet in length. The frame comprises a rectangular outline composed of four frame members 72 and also includes additional vertical frame members 74 and additional horizontal frame members 76. In the particular embodiment shown in FIG. 12, metal pipes 78 are affixed to base 18 by bolts 80 extending through the middle of legs 20. Semi-circular cutouts 82 are provided in the horizontal frame members 76 for receiving the vertically extending metal pipes 78. The vertically extending pipes give additional structural rigidity to the overall panel construction. In addition, they can serve as rods upon which two half-panels can be slipped so that there is no need for separately attaching the half-panels to the base 18. However, even where pipes 78 are used, separate attachment of the half-panels to the base can also be employed if desired.

FIG. 13 depicts a cross-sectional top view of a three-component assembly for the acoustic space divider of this invention having as the third component a metal supporting frame 81. Support frame 81, which is preferably fabricated of metal tubes for reasons of economy and light weight, is comprised of a series of horizontal and vertical components, much like that shown in FIG. 12. One horizontal member 83 is shown as are two vertical members 84. Vertical members 84 are suitably provided with opposed dovetail grooves 85, 87 which are capable of accepting dovetail tongues 86 attached to the half-panels 88, 90. Half-panels 88 and 90 are then easily slipped into place on the support frame 81. This embodiment provides additional overall stability in cases where a series of dividers are erected end to end.

Affixed to the opposed faces of the frame and forming a core section therebetween are membrane 54 and reinforcing layer 56. Each of these serves a dual purpose.

Membrane 54 not only holds the sound absorbing materials (as described hereinafter) in place, but also helps to reduce sound transmission. It is preferably a strong, non-porous material such as reinforced kraft paper, hardboard or the like. In a preferred embodiment, membrane 54 is composed of Lamotite, a brand name for an aluminum foil sheet with fiberglass scrim laminated to fire-retardant kraft paper. The membrane 54 can be attached to the face of the frame member by any suitable means such as tacking, stapling or gluing.

In addition to containing the sound absorbing materials, reinforcing layer 56 also adds stability to the overall structure of the panel. it is essential, however, that this layer have openings to permit the ingress of sound. Typical materials which may be used for this purpose are plastic netting, perforated foil laminates or wire mesh. For its noncombustibility, strength per unit weight and cost, a wire mesh with a hole size ranging from about ⅛" to 2" in diameter is most preferred. It has been found that larger diameter mesh openings do not sufficiently contain the sound absorbing material, while smaller diameter openings add excessive weight and cost to the panel without adding sufficient extra strength to warrant their use.

In the core portion of the panel between the membrane 54 and the reinforcing layer 56 is sound absorbing material. The sound absorbing material can be composed of any fire-retardant material which has the capability of absorbing sound, e.g. mineral wool, fiberglass, treated cellulose, etc. In the preferred embodiment, sound absorbing material 58 is a mineral wool batt of about ⅜" to 1¼" in thickness and with a density of from about 2 to about 6 PCF, and best results are achieved with a density of about 4 PCF. This material is used because of its unique combination of economy and good sound absorption.

The mineral wool batt can be used alone without any other sound absorbing material within the core. However, to increase the acoustical properties of the panel, a second sound absorbing material 60 is preferably employed. This material is preferably a glass fiber blanket having a density of from about 0.5 PCF to 3.0 PCF and more preferably about 1.5 PCF. A glass fiber blanket approximately ⅜" to ¾" is most preferred.

On the face of reinforcing layer 56 is mounted sound absorbing material 62. For lightness, fire rating, good sound absorbing properties, and imparting excellent "feel" to the fabric surface, this material is preferably a glass fiber blanket having a density of from about 0.5 PCF to 3.0 PCF. The blanket can suitably range in thickness from about ¼" to 2". In the most preferred embodiment this blanket is nominally ½" thick and has a density of about 0.5 PCF. This material was found to maximize the acoustical characteristics of the structure while still maintaining a streamlined appearance to the panel. Thicker or denser material would give the panel an undesirable "puffy" appearance because it could not be sufficiently compressed. It is not necessary for this insulating material 62 to be affixed to reinforcing layer 56, but it may be glued or taped thereto or stapled, etc., to frame members 24 if desired.

On the face of sound absorbing material 62 is a fabric covering layer 64, this layer having the dual purpose of protecting the fiberglass underlayer and providing a decorative effect. Typical covering materials are burlap, acrylics, polyesters and the like. Where fire retardancy and abrasion resistance are important, chemically treated polyesters or woven fiberglass are preferred. The fabric covering 64 may be secured to frame members 24 by any suitable means as discussed hereinbefore.

As can be seen from FIG. 10, the unique two half-panel construction of the present invention leaves an air space 55 between the two membranes 54. This air space in the middle of the panel has been found to be of considerable advantage in improving the acoustic performance of space dividers made according to the instant invention.

In the manufacture of high quality acoustic space dividers, the applicants have found it desirable that the space divider have a minimum noise reduction coefficient of at least 0.90 according to ASTM C423-66 and such a noise reduction coefficient can be achieved economically with the construction of the present invention. More particularly, and again referring to FIG. 10, the mineral wool batt is from about ⅜" to 1¼" thick and has a density of about 3-5 PCF. Fiberglass blanket 60 has a thickness of from about ⅜" to about ⅝" and a density of about 1-2 pounds. Fiberglass layer 62 has a thickness of from about ⅜" to about ⅝" and a density from about 0.5 to about 1.0 PCF. As previously explained, fiberglass blanket 62 is chosen because it gives an underlying layer which imparts excellent "feel" to the fabric surface as opposed to a mineral wool batt or the like. However, it has also been found that the core portion between the reinforcing layer 56 and the membrane 54 should contain both a fiberglass blanket and a mineral wool batt for maximum sound absorption at lowest cost. It would be theoretically possible to substitute a fiberglass blanket of 3.0–5.0 PCF density for the mineral wool batt and achieve the desired noise reduction coefficient of 0.9. However, because of the prohibitive cost of such a fiberglass blanket, this construction is totally impractical. While mineral wool batts are substantially less expensive than fiberglass blankets, it has been found that a mineral wool batt alone is not suitable for the core portion even if the thicknesses and densities are equivalent to those given hereinbefore for the mineral wool batt and the fiberglass blanket of the core portion. This is partially due to lack of structural integrity of a thin and low density mineral wool batt whereby it tends to separate and/or settle, resulting in a substantial loss in noise reduction coefficient. Furthermore, however, applicants have found that mineral wool batts tend to be non-homogeneous whereby there can be "loud spots" due to increased transmission of sound where the mineral wool batt is relatively less dense. The applicants have surprisingly found that the disadvantages of mineral wool and fiberglass alone can be overcome and yet an economical acoustic panel can be achieved by using the particular specified combination of a mineral wool batt and a fiberglass blanket within the core portion of the panel.

In addition to the mineral wool/fiberglass combination as just discussed, it is also preferred that one of the opposing membranes 54 of abutting half-panels 12 and 14 should be of a solid panel construction, e.g. hardboard or asbestos of approximately ⅛ inch thickness. It has been found that this construction also aids in reducing sound transmission. While both half-panels 12, 14 could be made with a hardboard or similar membrane it has been found that this does not measurably increase sound reduction and has the disadvantage of adding considerably cost and weight to the finished structure.

It has been found that when the product of the present invention is constructed as just described for the preferred embodiments, it meets the Class 1 fire hazard classification when tested in accordance with the ASTM E84-68 test method. In another important acoustic ring, besides the noise reduction coefficient, the structure's ability to block sound was exhibited by a Sound Transmission Class of not less than 30 as tested in accordance with ASTM 413-73 test method. Finally, the divider's overall ability in accomplishing a loss of sound transmission across the structure was demonstrated by a Noise Isolation Class of 20 as tested in accordance with PBS C.2 test procedures.

While it is preferred that both half-panels of the instant invention be acoustic, this is not absolutely necessary and FIG. 11 shows a cross-sectional side view of another embodiment of the invention. The space divider is shown generally at 10. In this case, half-panel 66 is constructed to be acoustic. However, half-panel 68 is not acoustic but is rather hard surfaced. This can be desirable for aesthetic reasons or because of practical reasons such as the back of a bookcase or copying machine.

Core member 69 of half-panel 68 may be any material which is sufficiently rigid throughout its area to retain its shape and to provide an acceptable surface for attaching cover layer 70. The preferred material for the core member 69 is ½" to 9/8" thick commercially available particle board, although metal, wood or plastic could be employed. Cover layer 70 can suitably be fabric, wood veneer, or metal or plastic laminate. The purpose of cover layer 70 is protective as well as decorative and it is preferably fire resistant so that the overall fire rating is maintained.

Half-panel 68, in addition to providing a sound transmission barrier for sound which originates from the direction of the acoustic half-panel 66, also provides the strength needed for various attachments such as lighting fixtures, work stations, cabinets and the like.

It will be understood that the claims are intended to cover all changes and modifications of the preferred embodiments of the invention, herein chosen for the purposes of illustration, which do not constitute departures from the spirit and scope of the invention.

What is claimed is:

1. A free-standing space divider suitable for separation of spaces in an open office plan comprising:
   (a) at least two half-panels having front and back faces, said half-panels being releasably connected together and easily separated and with at least a portion of their back faces in abutting relationship;
   (b) support means operative to support said half-panels in a free-standing, substantially vertical position; and
   (c) at least one said half-panel being an acoustic half-panel comprising:
      (i) a frame having a front face and a back face;
      (ii) a first layer affixed to said back face of the frame and a second layer affixed to said front face of the frame, a core being defined between said two layers and at least the second of said layers permitting the ingress of sound;
      (iii) acoustically absorbent material in said core;
      (iv) an acoustically absorbent blanket mounted on said front face exteriorly of said second layer;
      (v) a fabric cover on said front face exteriorly of said blanket.

2. The space divider of claim 1 wherein there are only two half-panels, each of which is sound absorbing and has a fabric outer covering.

3. The space divider of claim 2 wherein the fabric covering on one said half-panel has a color which is different from the color of the fabric on the other said half-panel.

4. The space divider of claim 2 wherein said support means includes a base member affixed to at least one said half-panel and a plurality of legs affixed to said base member.

5. The space divider of claim 2 wherein the two half-panels are releasably connected together by a connector comprising cooperating dovetail shaped tongue and groove members, one of said members being mounted on one said half-panel and the other said member being mounted on the other said half-panel.

6. The space divider of claim 1 wherein a plurality of said half-panels in abutting relationship have their opposing back faces offset with respect to each other.

7. An acoustic half-panel suitable for use in the free-standing divider of claim 1, said half-panel comprising:
   (a) a frame having a substantially rectangular perimeter;
   (b) a membrane affixed to the back face of said frame, said membrane being non-porous;
   (c) a reinforcing layer affixed to the front face of the frame, said reinforcing layer having openings to permit the ingress of sound;
   (d) said membrane and reinforcing layer forming a core portion of said half-panel therebetween;

(e) a mineral wool batt in said core portion, said mineral wool batt being from about ¾" to about 1¼" thick and having a density of from about 2 to about 6 pounds per cubic foot;

(f) a first glass fiber blanket in said core portion, said glass fiber blanket being from about ⅜" to about ¾" thick and having a density of from about 0.5 to about 3.0 pounds per cubic foot;

(g) a second glass fiber blanket on the front face of said reinforcing layer exterior the said core portion, said second glass fiber blanket having a thickness from about ¼" to about 2" and a density of from about 0.5 to about 3.0 pounds per cubic foot; and (h) a fabric cover on the face of said second glass fiber blanket, said fiber cover being secured to the back face of the said frame.

8. The acoustic half-panel of claim 7 wherein said mineral wool batt has a density of about 4 pounds per cubic foot.

9. The acoustic half-panel of claim 7 wherein said first glass fiber blanket has a density of about 1.5 pounds per cubic foot.

10. The acoustic half-panel of claim 7 wherein said second glass fiber blanket has a thickness of about ½" and a density of about 0.5 pounds per cubic foot.

11. The acoustic half-panel of claim 7 wherein said reinforcing layer is a wire mesh with a hole size of from about ½" to about 2" in diameter.

12. The acoustic half-panel of claim 7 wherein said fabric cover is of a material selected from the group consisting of polyesters chemically treated for fire retardancy, and woven fiber glass.

13. An acoustic half-panel of claim 7 wherein said membrane is a reinforced fire-retardant kraft paper.

14. An acoustic half-panel of claim 7 wherein the membrane is a hardboard of approximately ⅛" thickness.

15. An acoustic divider comprising two of the half-panels of any one of claims 7–14.

16. An acoustic divider according to claim 15 having a Class 1 fire hazard rating according to ASTM E84-68.

17. An acoustic divider according to claim 15 having a Sound Transmission Class of not less than 30 according to ASTM 413-73.

18. An acoustic divider according to claim 15 having a Noise Isolation Class of 20 when tested to PBS C.2.

19. An acoustic divider according to claim 15 having a Noise Reduction Coefficient of at least 0.90 according to ASTM C423-66.

* * * * *